Jan. 14, 1947. A. MOULTON 2,414,324
CONNECTING MEANS FOR SHAKER CONVEYER TROUGHS
Filed Sept. 6, 1945
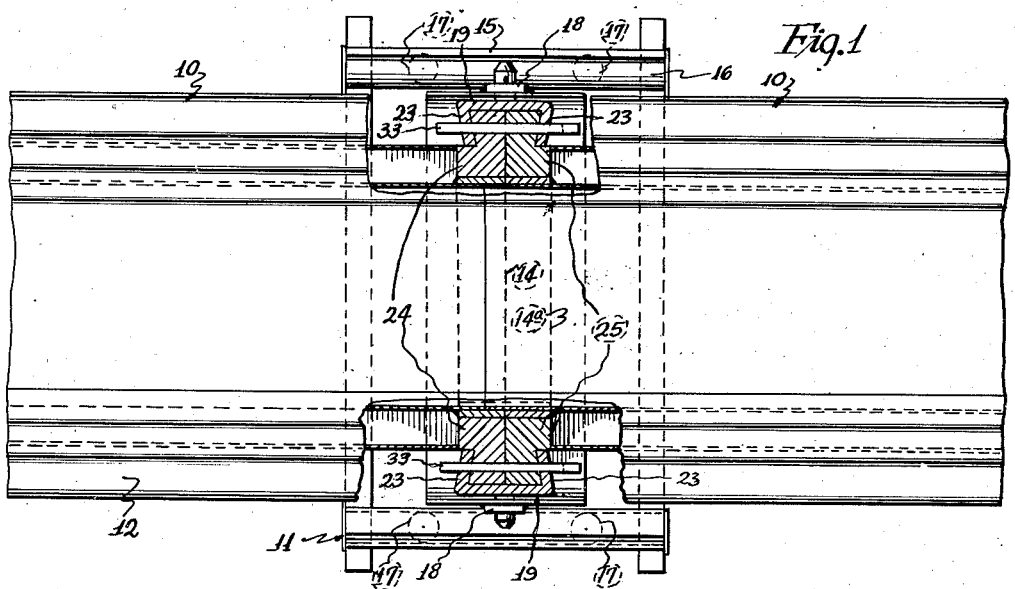
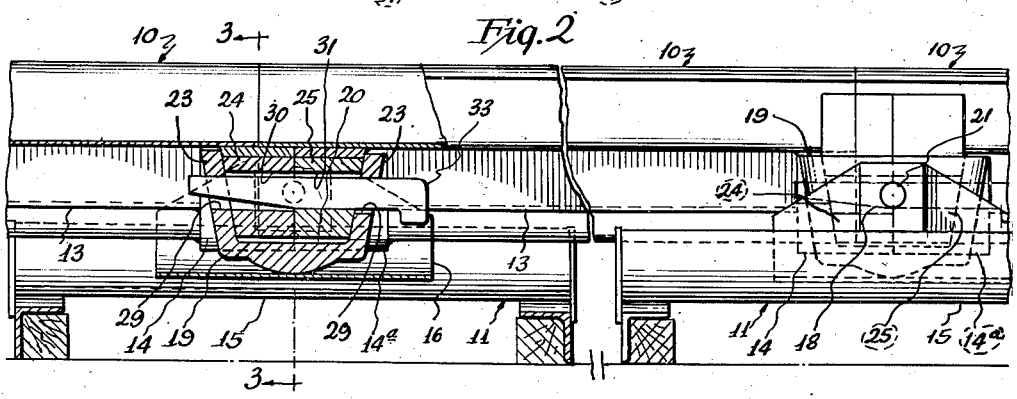
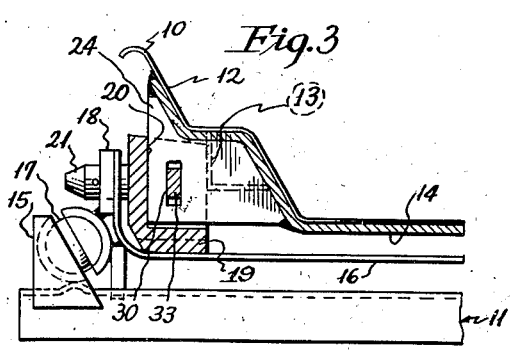
INVENTOR
Albion Moulton
Clarence F. Poole
ATTORNEY Patented Jan. 14, 1947

2,414,324

UNITED STATES PATENT OFFICE 2,414,324

CONNECTING MEANS FOR SHAKER CONVEYER TROUGHS

Albion Moulton, Philadelphia, Pa., assignor to Goodman Manufacturing Company, Chicago, Ill., a corporation of Illinois Application September 6, 1945, Serial No. 614,629

10 Claims. (Cl. 198—220)

This invention relates to improvements in connecting means for the troughs of a shaker conveyer trough line.

The principal objects of my invention are to provide an improved and simplified form of connecting means for connecting the troughs of a shaker conveyer together, wherein the troughs may be connected by lowering them into sockets carried by the reciprocating support for the conveyer, and which does away with the usual connecting bolts heretofore used for this purpose.

My invention may be more clearly understood with reference to the accompanying drawing wherein:

Figure 1 is a fragmentary plan view of adjacent ends of two troughs of a shaker conveyer trough line, with certain parts of the troughs broken away and certain parts of the connecting means shown in substantially horizontal section;

Figure 2 is an enlarged view in side elevation of the troughs of a shaker conveyer trough line with certain parts of the trough broken away and certain parts of the connecting means shown in substantially longitudinal section; and Figure 3 is a fragmentary transverse sectional view taken substantially along line 3—3 of Figure 2.

In the embodiment of my invention illustrated in the drawing, two shaker conveyer troughs 10, 10 are shown as being mounted on a ball frame 11 and as being connected together in abutting relation with respect to each other. Said troughs are each of a usual construction having a flat bottom and outwardly inclined flared sides 12, 12, with upper and lower inclined portions and intermediate substantially horizontal shouldered portions. Said side walls are herein shown as being reinforced by angles 13, 13 extending along the outer sides thereof and secured thereto at the ends of their legs to the undersides of said shouldered portions and the outsides of the lower flared portions of said troughs. A reinforcing plate 14 extends across the bottom of and upwardly along opposite sides of one end of the trough 10 and projects beyond the end thereof and is overlapped by the adjacent end of the next adjacent trough 10. A reinforcing plate 14a extends along the adjacent end of the next adjacent trough 10 and is abutted by the reinforcing plate 14. Said reinforcing plates, besides reinforcing the ends of the troughs, also serve to close the joint therebetween when the troughs are in connected relation with respect to each other.

The ball frame 11 may be of any well known construction and is herein shown as including a lower frame member 15 suitably held in fixed relation with respect to the ground during operation of the conveyer and as having an upper frame member 16 mounted thereon and guided for reciprocable movement therealong on balls 17, 17. The upper frame member of said ball frame is provided with a pair of longitudinally extending upright ears 18, 18 at opposite sides thereof and spaced laterally from the side walls of said troughs (see Figures 1 and 3). Each of said ears is adapted to form a pivotal support for a connecting member 19 having a socket 20 formed therein, which is open at its top and inner side. Said connecting members are pivotally mounted on said ears for movement about an axis extending transversely of the conveyer on a laterally extending integrally formed pin 21. Said pin may be drilled adjacent its end to receive a cotter key (not shown) for retaining said connecting member to said ear.

The connecting member 19 is herein shown as having an outer vertical end wall from which the pin 21 extends, and as having oppositely inclined side walls 23, 23 inclined outwardly from the bottom of the socket 20 and also inclined inwardly from the outer side thereof. Said side walls with the end wall of said connecting member thus form said socket in substantially the shape of a dovetail in plan opening towards the conveyer trough (see Figure 1).

The socket 20 is adapted to receive two abutting tongues 24, 25 extending laterally from opposite sides of adjacent ends of the troughs 10, 10, respectively. The tongues 24, 24 extend from opposite sides of the reinforcing plate 14, from the upper outer boundaries thereof to a position just beneath the bottom of said trough. The tongues 25, 25 similarly extend from the reinforcing plate 14a. The portions of said tongues beneath the shouldered portions of said troughs and adjacent the lower flared portions of the side walls of said troughs are herein shown as being in alignment with the reinforcing angles 13, 13 which form reinforcing columns for said troughs, and which are so arranged that the stresses in the conveyer trough line will be taken through said columns and tongues at the abutting faces thereof, to form reinforcing columns for the entire length of the trough line in a manner similar to that shown and described in Patent No. 2,283,825, which issued to William W. Sloane on May 19, 1942.

The tongues 24 and 25 have plane vertical abutting surfaces and outer inclined surfaces conforming to the angles of inclination of the inner sides 23, 23 of the socket 20. When said tongues 24 and 25 are in abutting relation with respect to each other, they form a tongue of a substantially dovetail formation in plan, the sides of which incline outwardly from the lower ends thereof so that as they are engaged with the sides 23, 23 of the socket 20 and drop within said socket, said inclined side walls will move said tongues towards each other and hold them in abutting relation with respect to each other and will prevent them from moving laterally with respect to said sockets.

The tongues 24, 24 and reinforcing plate 14 extend beyond the end of the trough 10 to which they are secured, and overlap the adjacent end of the next adjacent trough 10, while the tongues 25, 25 and reinforcing plate 14a are spaced inwardly from the end of the trough 10 to which they are secured, a distance equal to the distance the tongues 24, 24 overlap said end of said trough. It is of course understood that each trough 10 of the conveyer trough line has a reinforcing plate 14 and tongues 24, 24 at one of its ends and projecting beyond the end thereof, and has a reinforcing plate 14a and tongues 25, 25 at its opposite end and spaced inwardly from the end thereof. Said tongues 24, 24 and the reinforcing plate 14 are thus overlapped by the adjacent end of said next adjacent trough, so that when said tongues 25, 25 are secured within their sockets, said side walls of said next adjacent trough may hold said tongues 24, 24 in position within their sockets in abutting relation with respect to said tongues 25, 25.

The side walls 23, 23 of the sockets 20, 20 are herein shown as being slotted in a direction extending longitudinally of the conveyer, as indicated by reference characters 29, 29. The projecting tongues 24 and 25 are likewise shown as being slotted in a direction extending longitudinally of the conveyer, as indicated by reference characters 30 and 31. The slotted portions of said tongues and side walls are adapted to receive a key 33, the lower side of which is inclined upwardly from a point near its center towards the outer end thereof, to permit ready insertion of said key within the slots 29, 31, 30 and 29, and to cause said key to force said tongue 25 downwardly within its socket when driven in place through the slotted portions thereof, and to positively hold said tongue down within said socket and thus cause the end of the trough 10 which overlaps the reinforcing plates 14, 14 and the tongues 24, 24, to hold said tongues within said sockets, during reciprocation of the conveyer.

It should here be noted that clearance is provided between the key 33 and the slot 30 of the tongue 24 so that said key serves only to hold the tongue 25 within its socket. This makes it possible to first insert the tongues 24, 24 within their sockets and then insert the tongues 25, 25 in abutting relation with respect to said first mentioned tongues, and allows the keys 33, 33 to wedge the tongues 25, 25 downwardly within their sockets without tending to drive the tongues 24, 24 down within the same sockets, and thus simplifies the connection of the troughs together and facilitates the driving of the keys into position.

In connecting the troughs of the shaker conveyer together, the tongues 24, 24 are first lowered within the sockets 20, 20. The tongues 25, 25 of the next adjacent trough are then lowered within said sockets adjacent to said first mentioned tongues. The keys 33, 33 are then inserted in the slots 29, 29 of one of the side walls 23, 23 and through the slots 31, 31 of the tongues 25, 25, and driven through said slots and the slots 30, 30 of the tongues 24, 24, and through the slots 29, 29 of the opposite side walls 23, 23, to positively force the tongues 25, 25 downwardly within said sockets and to align said tongues 24, 24 with said tongues 25, 25.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a connecting means for the troughs of a shaker conveyer trough line, a reciprocable support, a pair of connecting members spaced laterally from opposite sides of said troughs and pivotally mounted on said support for movement about a transverse axis, said connecting members having sockets formed therein opening at their upper ends and towards said troughs, and tongues projecting laterally from opposite sides of adjacent ends of said troughs and adapted to be supported in said sockets, said sockets of said connecting members having side walls inclined outwardly from the bottoms thereof, and the sides of said tongues being inclined to conform to said side walls of said sockets so said side walls will draw adjacent faces of said tongues together upon insertion thereof within said sockets.

2. In a connecting means for the troughs of a shaker conveyer trough line, a reciprocable support, a pair of connecting members spaced laterally from opposite sides of said troughs and pivotally mounted on said support for movement about a transverse axis, said connecting members having sockets formed therein, opening at their upper ends and towards said troughs, said sockets having opposite upright side walls inclined inwardly from the outer sides thereof, and tongues projecting laterally from opposite sides of adjacent ends of said troughs and adapted to engage and be mounted in said sockets in abutting relation with respect to each other, and the sides of said tongues opposite from the abutting faces thereof being inclined inwardly from the outer sides thereof and said tongues when in abutting relation with each other being in the form of a dovetail in horizontal section, to conform to the side walls of said socket members and positively lock said troughs from lateral movement with respect to said sockets when inserted therein.

3. In a connecting means for the troughs of a shaker conveyer trough line, a reciprocable support, a pair of connecting members spaced laterally from opposite sides of said troughs and pivotally mounted on said support for movement about a transverse axis, said connecting members having sockets formed therein, opening at their upper ends and towards said troughs, said sockets having opposite upright walls inclined outwardly from the bottoms thereof and also inclined inwardly from the outer sides thereof, and tongues projecting laterally from the opposite side walls of adjacent ends of said troughs and adapted to be mounted within said sockets in abutting relation with respect to each other, the sides of said tongues opposite from the abutting faces thereof being inclined outwardly from the bottoms thereof to tend to draw said tongues together upon insertion within said sockets, and being inclined inwardly from the outer sides thereof, to cause said tongues when in abutting relation with respect to each other to be in the form of a dovetail in horizontal section, to positively lock said tongues from lateral movement with respect to said sockets.

4. In a connecting means for the troughs of a shaker conveyer trough line, a reciprocable support, a pair of connecting members spaced laterally from opposite sides of said troughs and pivotally mounted on said support for movement with respect thereto about a transverse axis, said connecting members having sockets formed therein opening at their upper ends and towards said troughs, tongues projecting laterally from opposite sides of adjacent ends of said troughs and adapted to be supported in said sockets, said tongues and the side walls of said sockets being slotted in a direction extending longitudinally of said troughs, and keys adapted to be inserted in said slotted portions of said associated sockets and tongues, to positively hold said tongues within said sockets.

5. In a trough connecting means for the troughs of a shaker conveyer trough line, a reciprocable support, a pair of connecting members spaced laterally from the sides of said troughs and pivotally mounted on said support for movement with respect thereto about a transverse axis, said connecting members having sockets formed therein opening at their upper ends and towards said troughs, and tongues projecting laterally from opposite sides of adjacent ends of said troughs and adapted to be supported in said sockets, opposite side walls of said sockets being inclined outwardly from the bottoms of said socket, the side walls of said tongues opposite from their abutting surfaces being inclined to conform to said side walls, said tongues and side walls being slotted in a direction extending longitudinally of said troughs and in alignment with each other when said tongues are inserted in said sockets in abutting relation with respect to each other, and a key adapted to extend through said slotted portions of said side walls of each of said sockets and through said slotted portions of said tongues, to positively lock said tongues within said sockets during operation of the conveyer.

6. In a connecting means for the troughs of a shaker conveyer trough line, a reciprocable support, a pair of connecting members spaced laterally from opposite sides of said troughs and pivotally mounted on said support for movement about a transverse axis, said connecting members having sockets formed therein, opening at their upper ends and towards said troughs, said sockets having opposite upright side walls inclined inwardly from the outer sides thereof, and tongues projecting laterally from opposite sides of adjacent ends of said troughs and adapted to engage and be mounted in said sockets in abutting relation with respect to each other, the sides of said tongues opposite from the abutting faces thereof being inclined inwardly from the outer sides thereof so that said tongues when in abutting relation with each other will be in the form of a dovetail in horizontal section, to conform to the side walls of said socket members and to positively lock said troughs from lateral movement with respect to said sockets, said tongues and said side walls of said sockets being slotted in a direction extending longitudinally of said troughs and in alignment with each other when said tongues are inserted in said sockets in abutting relation with respect to each other, and a key adapated to extend through said slotted portions of said side walls of each of said sockets and through said slotted portions of said tongues, to positively lock said tongues within said sockets during operation of the conveyer.

7. In a connecting means for the troughs of a shaker conveyer trough line, a reciprocable support, a pair of connecting members spaced laterally from opposite sides of said troughs and pivotally mounted on said support for movement about a transverse axis, said connecting members having sockets formed therein, opening at their upper ends and towards said troughs, said sockets having opposite upright walls inclined outwardly from the bottoms thereof and also inclined inwardly from the outer sides thereof, and tongues projecting laterally from opposite side walls of adjacent ends of said troughs and adapted to be mounted within said sockets in abutting relation with respect to each other, the sides of said tongues opposite from the abutting faces thereof being inclined outwardly from the bottoms thereof to tend to draw said tongues together upon insertion within said sockets, and being inclined inwardly from the outer sides thereof, to cause said tongues when in abutting relation with respect to each other, to be in the form of a dovetail in horizontal section to positively lock said tongues from lateral movement with respect to said socket, said tongues and said side walls of said sockets being slotted in a direction extending longitudinally of said troughs and in alignment with each other when said tongues are inserted in said sockets in abutting relation with respect to each other, and a key adapted to extend through said slotted portions of said side walls of each of said sockets and through said slotted portions of said tongues, to positively lock said tongues within said sockets during operation of the conveyer.

8. In a trough connecting means for the troughs of a shaker conveyer trough line, a reciprocable support, a pair of connecting members spaced laterally from the sides of said troughs and pivotally mounted on said support for movement with respect thereto about a transverse axis, said connecting members having sockets formed therein opening at their upper ends and towards said troughs, and tongues projecting laterally from opposite sides of adjacent ends of said troughs and adapted to be supported in said sockets, the tongues projecting laterally from opposite sides of one trough extending beyond the end thereof along an adjacent end of the next adjacent trough and overlapped by a portion of said adjacent end of said next adjacent trough so said next adjacent trough will hold said tongues within their associated sockets, and the tongues projecting laterally from the adjacent end of said next adjacent trough being spaced inwardly from the end thereof and adapted to be abutted by said tongues projecting beyond the end of said next adjacent trough, said tongues and opposite side walls of said sockets being slotted in a direction extending longitudinally of said troughs, and a key adapted to be driven through the slotted portions of each socket and through said slotted portions of said tongues, to hold said tongues within said sockets and hold said troughs in connected relation with respect to each other.

9. In a trough connecting means for the troughs of a shaker conveyer trough line, a reciprocable support, a pair of connecting members spaced laterally from the sides of said troughs and pivotally mounted on said support for movement with respect thereto about a transverse axis, said connecting members having sockets formed therein open at their upper ends and towards said troughs, and tongues projecting laterally from opposite sides of adjacent ends of said troughs and adapted to be supported in said sockets, the tongues projecting laterally from opposite sides of one trough extending beyond the end thereof along an adjacent end of the next adjacent trough, and overlapped by a portion of said adjacent end of said next adjacent trough so said next adjacent trough will hold said tongues within their associated sockets, and the tongues projecting laterally from the adjacent end of said next adjacent trough being spaced inwardly from the end thereof and adapted to be abutted by said tongues projecting beyond the end of said next adjacent trough, said tongues and opposite side walls of said sockets being slotted in a direction extending longitudinally of said troughs, and a key adapted to be driven through the slotted portions of each socket and through said slotted portions of said tongues, to hold said tongues within said sockets and to hold said troughs in connected relation with respect to each other, said keys being so formed as to drive the tongues projecting from the trough which overlaps the next adjacent tongues within their sockets, but clearing said slotted portion of said overlapped tongue when said tongues are within said sockets, to facilitate insertion of said keys and to cause said overlapping trough to hold said overlapped tongues within their sockets.

10. In a trough connecting means for the troughs of a shaker conveyer trough line, a reciprocable support, a pair of connecting members spaced laterally from the sides of said troughs and pivotally mounted on said support for movement with respect thereto about a transverse axis, said connecting members having sockets formed therein opening at their upper ends and towards said troughs, and tongues projecting laterally from opposite sides of adjacent ends of said troughs and adapted to be supported in said sockets, the tongues projecting laterally from opposite sides of one trough extending beyond the end thereof along an adjacent end of the next adjacent trough, and overlapped by a portion of said adjacent end of said next adjacent trough so said next adjacent trough will hold said tongues within their associated sockets, and the tongues projecting laterally from the adjacent end of said next adjacent trough being spaced inwardly from the end thereof and adapted to be abutted by said tongues projecting beyond the end of said next adjacent trough, said sockets having opposite upright side walls inclined inwardly from the outer sides thereof, and the sides of said tongues opposite the abutting faces thereof being inclined inwardly from the outer sides thereof to cause said tongues when in abutting relation to be in the form of a dovetail in horizontal section to positively lock said tongues from lateral movement with respect to said sockets, and means extending through said tongues and sockets for holding said tongues from upward movement with respect to said sockets during reciprocation of the conveyer.

ALBION MOULTON.